(12) United States Patent
Thorne et al.

(10) Patent No.: US 12,692,646 B2
(45) Date of Patent: Jul. 28, 2026

(54) CARBON DIOXIDE-BASED CLEANING SYSTEMS

(71) Applicant: Hamilton Sundstrand Space Systems International, Inc., Windsor Locks, CT (US)

(72) Inventors: Daniel Thorne, Terryville, CT (US); Ashley Rose Himmelmann Schuster, Chicago, IL (US); Daniel J. Kaplan, Melbourne Beach, FL (US)

(73) Assignee: HAMILTON SUNDSTRAND SPACE SYSTEMS INTERNATIONAL, INC., Windsor Locks, CT (US)

( * ) Notice: Subject to any disclaimer, the term of this patent is extended or adjusted under 35 U.S.C. 154(b) by 114 days.

(21) Appl. No.: 18/596,030

(22) Filed: Mar. 5, 2024

(65) Prior Publication Data

US 2025/0283270 A1     Sep. 11, 2025

(51) Int. Cl.
*D06F 43/02* (2006.01)
*B64G 1/60* (2006.01)
*D06F 43/00* (2006.01)
*D06F 43/08* (2006.01)

(52) U.S. Cl.
CPC .............. *D06F 43/02* (2013.01); *B64G 1/60* (2013.01); *D06F 43/007* (2013.01); *D06F 43/083* (2013.01); *D06F 43/085* (2013.01)

(58) Field of Classification Search
None
See application file for complete search history.

(56) References Cited

U.S. PATENT DOCUMENTS

| | | | |
|---|---|---|---|
| 5,467,492 A | 11/1995 | Chao et al. | |
| 6,360,392 B1 | 3/2002 | Malchow | |
| 6,442,980 B2 | 9/2002 | Preston et al. | |
| 11,767,629 B2 | 9/2023 | Choi et al. | |

(Continued)

FOREIGN PATENT DOCUMENTS

| | | | | |
|---|---|---|---|---|
| CN | 115726112 A | * | 3/2023 | ............... D06F 9/00 |
| KR | 20230144404 A | * | 10/2023 | ........... D06F 43/081 |

(Continued)

OTHER PUBLICATIONS

CleanLogix LLC, 1 page, retrieved Feb. 2016, retrieved from https://cleanlogix.com/wp-content/uploads/2016/02/CO2-Immersion-Tech-cc.jpg.

(Continued)

*Primary Examiner* — Omair Chaudhri
(74) *Attorney, Agent, or Firm* — CANTOR COLBURN LLP

(57) ABSTRACT

Carbon dioxide-based cleaning systems include a holding tank containing a supply of liquid carbon dioxide ($CO_2$), a rotary cleaner having an internal drum arranged therein, the rotary cleaner fluidly coupled to the holding tank to receive liquid $CO_2$ therefrom, the rotary cleaner configured to output $CO_2$ with contaminants after a cleaning cycle, a compressor arranged to receive gaseous $CO_2$ and increase a pressure of the gaseous $CO_2$, and a condenser arranged to receive the increased pressure gaseous $CO_2$ from the compressor and convert the gaseous $CO_2$ into liquid $CO_2$ and direct the liquid $CO_2$ into the holding tank.

19 Claims, 6 Drawing Sheets

(56) References Cited

U.S. PATENT DOCUMENTS

| | | | | | |
|---|---|---|---|---|---|
| 2002/0004954 | A1* | 1/2002 | Preston | .................. | D06F 43/00 |
| | | | | | 134/107 |
| 2002/0194681 | A1* | 12/2002 | DeYoung | ............. | D06F 43/005 |
| | | | | | 68/17 R |
| 2003/0182731 | A1* | 10/2003 | Worm | .................. | D06F 43/007 |
| | | | | | 8/158 |
| 2004/0020510 | A1* | 2/2004 | Roseen | .................. | D06F 43/00 |
| | | | | | 134/1 |
| 2010/0146992 | A1* | 6/2010 | Miller | ....................... | F17C 3/04 |
| | | | | | 62/53.2 |
| 2022/0154387 | A1* | 5/2022 | Kwon | .................. | D06F 43/083 |
| 2022/0154388 | A1 | 5/2022 | Bae et al. | | |
| 2022/0235514 | A1 | 7/2022 | Park et al. | | |
| 2024/0026596 | A1 | 1/2024 | Kim et al. | | |

FOREIGN PATENT DOCUMENTS

| | | | | | |
|---|---|---|---|---|---|
| RU | | 2598313 C1 * | 9/2016 | | |
| WO | WO-2022158931 A2 * | | 7/2022 | ............. | D06F 43/08 |

OTHER PUBLICATIONS

EPA "Case Study: Liquid Carbon Dioxide (CO2) Surfactant System for Garment Care", May 1999, pp. 1-5.

Fox, Alex "NASA Just Put Doing the Laundry on Astronauts' Chore List", Smithsonian Magazine, Jun. 25, 2021, pp. 1-6.

Green America "Green Dry Cleaning", pp. 1-13, retrieved Jan. 30, 24, retrieved from https://greenamerica.org/green-living/green-dry-cleaning#:~: text=Clothes%20are%20rotated%20in%20a,is%20released%20in%20the%20air.

Marentis, Rodger "Current Status & Technical Challenges of Liquid Carbon Dioxide Dry Cleaning", pp. 1-6, retrieved Jan. 30, 24, retrieved from https://www.analytix.co.uk/wp-content/uploads/2015/02/TN-15-Liquid-CO2-Dry-Cleaning.pdf.

Tersus Solutions, "Textile Recommerce and Recycling", pp. 1-5, retrieved Jan. 30, 2024, retrieved from https://www.tersussolutions.com/.

Visram, Talib "'NASA Tide' will be the first-ever laundry detergent for astronauts", FastCompany, Jun. 23, 2021, pp. 1-15.

* cited by examiner

CARBON DIOXIDE-BASED CLEANING SYSTEMS

BACKGROUND

The subject matter disclosed herein generally relates to carbon dioxide-based cleaning systems and, more particularly, to carbon dioxide cleaning systems for use in low-, micro-, and zero-gravity environments.

In current space exploration and travel, supplying clean clothing and cleaning of dirty clothing provides logistical and financial challenges. Currently, there is no way to clean dirty laundry in space. As such, clothing is a consumable that must be brought up to a space station or vehicle, or must be carried onboard. Once the clothing has been used and worn out, the clothing is discarded, and new clothing must be provided. For example, clothing on the International Space Station is supplied to the Station about once a year, with about 68 kg of clothing being launched for each astronaut on the Station. With very high launch costs based on weight (e.g., \$10,000/kg), and multiple astronauts, the cost of providing clean clothing can be very expensive, and requires space both on the launch vehicle each time plus storage space onboard the Station for new and old clothing.

Additionally, as human space exploration expands, such as by way of deep space missions, extended missions on the Moon, to asteroids, Mars, and the like, resupply and replacement clothing cannot be easily or feasibly provided. On such missions, all clothing to be used for the duration of the mission must be launched and then carried by the crew and craft/station. Conventional cleaning systems require water and are designed to operate on Earth, having gravity at play along with access to resources, such as water. In view of this, it may be beneficial to develop systems for cleaning clothing in low-, micro-, and zero-gravity environments without water.

SUMMARY

According to some embodiments, carbon dioxide-based cleaning systems are provided. The cleaning systems include a holding tank containing a supply of liquid carbon dioxide ($CO_2$), a rotary cleaner having an internal drum arranged therein, the rotary cleaner fluidly coupled to the holding tank to receive liquid $CO_2$ therefrom, the rotary cleaner configured to output $CO_2$ with contaminants after a cleaning cycle, a compressor arranged to receive gaseous $CO_2$ and increase a pressure of the gaseous $CO_2$, and a condenser arranged to receive the increased pressure gaseous $CO_2$ from the compressor and convert the gaseous $CO_2$ into liquid $CO_2$ and direct the liquid $CO_2$ into the holding tank.

In addition to one or more of the features described herein, or as an alternative, further embodiments of the carbon dioxide-based cleaning systems may include that the output $CO_2$ with contaminants is directed from the rotary cleaner to the compressor after the cleaning cycle.

In addition to one or more of the features described herein, or as an alternative, further embodiments of the carbon dioxide-based cleaning systems may include a distillation tank arranged between the rotary cleaner and the compressor, the distillation tank configured to receive at least one of gaseous and liquid $CO_2$ from the rotary cleaner and separate contaminants from the $CO_2$ and supply clean gaseous $CO_2$ to the compressor.

In addition to one or more of the features described herein, or as an alternative, further embodiments of the carbon dioxide-based cleaning systems may include that the distillation tank is coaxially arranged within the rotary cleaner.

In addition to one or more of the features described herein, or as an alternative, further embodiments of the carbon dioxide-based cleaning systems may include that the distillation tank comprises a valve configured to selective fluidly couple a distillation cavity defined within the distillation tank with a cleaning cavity defined within the rotary cleaner and external to the distillation tank.

In addition to one or more of the features described herein, or as an alternative, further embodiments of the carbon dioxide-based cleaning systems may include a heating element arranged to provide heat to the distillation tank.

In addition to one or more of the features described herein, or as an alternative, further embodiments of the carbon dioxide-based cleaning systems may include a slug tank arranged to receive $CO_2$ and contaminants captured by the $CO_2$ from the distillation tank.

In addition to one or more of the features described herein, or as an alternative, further embodiments of the carbon dioxide-based cleaning systems may include that the internal drum is porous to liquid $CO_2$ and contaminants carried by the liquid $CO_2$ but prevents clothing from passing out of the internal drum.

In addition to one or more of the features described herein, or as an alternative, further embodiments of the carbon dioxide-based cleaning systems may include that the rotary cleaner comprises a cleaning cavity defined within the internal drum and an annular cavity is defined radially between an external surface of the internal drum and an internal surface of an outer housing of the rotary cleaner.

In addition to one or more of the features described herein, or as an alternative, further embodiments of the carbon dioxide-based cleaning systems may include a valve arranged on the rotary cleaner and configured to selectively open to evacuate gas from a cleaning cavity of the rotary cleaner.

In addition to one or more of the features described herein, or as an alternative, further embodiments of the carbon dioxide-based cleaning systems may include a pump associated with the valve, the pump configured to provide a motive force to draw the gas from the cleaning cavity of the rotary cleaner.

In addition to one or more of the features described herein, or as an alternative, further embodiments of the carbon dioxide-based cleaning systems may include a filter and pump connected to the rotary cleaner, wherein the pump is configured to pull liquid $CO_2$ from the rotary cleaner and pass it through the filter and then redirect the liquid $CO_2$ back into the rotary cleaner.

In addition to one or more of the features described herein, or as an alternative, further embodiments of the carbon dioxide-based cleaning systems may include a dispenser arranged along a flow path through the pump and the filter, wherein the dispenser is configured to apply at least one of a deodorizer and a detergent to the liquid $CO_2$ prior to being redirected back into the rotary cleaner.

In addition to one or more of the features described herein, or as an alternative, further embodiments of the carbon dioxide-based cleaning systems may include an auxiliary supply of $CO_2$ arranged upstream from the compressor, the auxiliary supply of $CO_2$ configured to provide additional $CO_2$ into the system to replenish losses from the holding tank.

In addition to one or more of the features described herein, or as an alternative, further embodiments of the carbon dioxide-based cleaning systems may include a slug tank arranged to receive $CO_2$ and contaminants captured by the $CO_2$ from the rotary cleaner.

In addition to one or more of the features described herein, or as an alternative, further embodiments of the carbon dioxide-based cleaning systems may include a valve configured to fluidly couple a cleaning cavity of the rotary cleaner with an ambient environment.

In addition to one or more of the features described herein, or as an alternative, further embodiments of the carbon dioxide-based cleaning systems may include that the ambient environment is defined within a spacecraft.

In addition to one or more of the features described herein, or as an alternative, further embodiments of the carbon dioxide-based cleaning systems may include that the ambient environment is defined within a space station.

In addition to one or more of the features described herein, or as an alternative, further embodiments of the carbon dioxide-based cleaning systems may include that the ambient environment is defined within a station on a non-Earth celestial object.

In addition to one or more of the features described herein, or as an alternative, further embodiments of the carbon dioxide-based cleaning systems may include that the holding tank is a bellows tank arranged to maintain the liquid $CO_2$ under pressure and in a liquid state.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
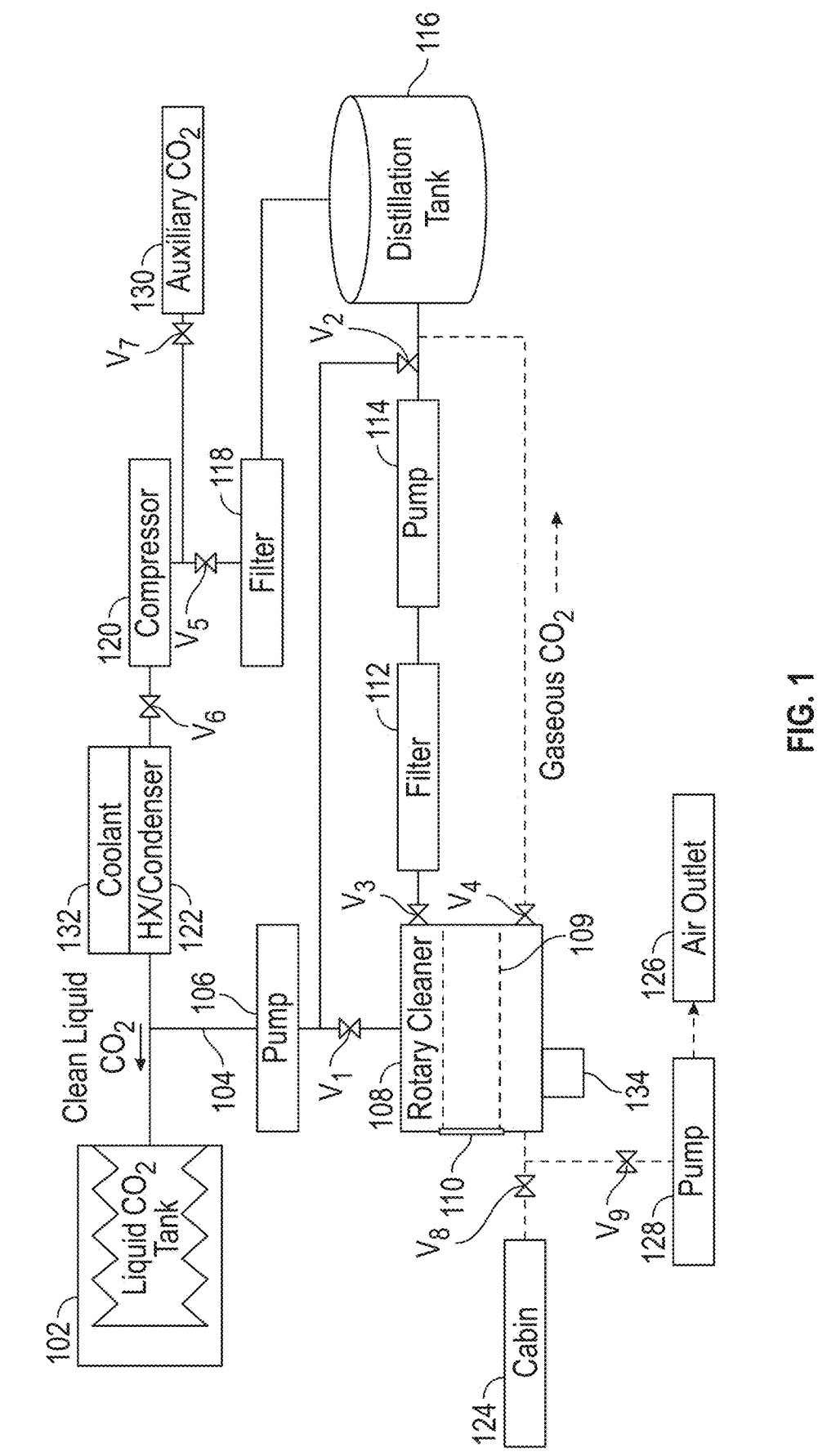
FIG. 1 is a schematic diagram of a closed-loop $CO_2$ cleaning system for use in low-, micro-, and zero-gravity environments, in accordance with an embodiment of the present disclosure.

As shown and described herein, various features of the disclosure will be presented. Various embodiments may have the same or similar features and thus the same or similar features may be labeled with similar reference numerals and/or description thereof may be omitted in certain later described embodiments for conciseness. Although similar reference numbers may be used in a generic sense, various embodiments will be described and various features may include changes, alterations, modifications, etc. as will be appreciated by those of skill in the art, whether explicitly described or otherwise would be appreciated by those of skill in the art. Further, it will be appreciated that, unless otherwise stated, features from the various separately described embodiments may be combined in various combinations and each embodiment is not intended to be mutually exclusive from features of other embodiments described herein and/or mutually exclusive from other features and components not explicitly described.

As human space exploration continues and the time and distance of the duration in space continues, clean clothing supply will become an issue that must be addressed. Currently, there is no way to clean dirty laundry in space, and as a result, worn out and used clothing is discarded with trash and other waste. Such a solution has been feasible for low Earth orbit stations (e.g., International Space Station), as the Station is relatively close to Earth, resupply missions happen regularly, and the Station is generally government supported, resulting is relatively high budget that can absorb the cost of regular clothing replacement and resupply. For example, 150 pounds or 68 kg of fresh clothes must be replenished on crewed missions to the International Space Station. Assuming a cost of about $10,000/kg, this results in a cost of about $680,000 of launch cost per crew member per year.

Future deep space crewed missions will not be able to throw anything away, and so a solution for cleaning dirty clothes is needed. Moreover, as more commercial space exploration expands, reducing the costs of launch and resupply (e.g., by reducing the amount of clothing launched) can provide significant benefits. Conventional clothing cleaning relies upon the use of water. However, water is a scarce and very limited resource when in space, whether on a spacecraft, a station, or a base/station that is on a celestial body (e.g., the Moon, Mars, asteroid, etc.). Additionally, because such space-based cleaning operations must necessarily take place in non-Earth-based gravity environments (e.g., low-, micro-, or zero-gravity environments), cleaning systems must be configured to operate in such space environments, without the assistance of gravity. As used herein, the term "microgravity" will be used to encompass low-gravity, micro-gravity, and zero-gravity environments. Microgravity environments, as intended herein, includes environments including, but not limited to, orbits about a celestial body, open space travel or transit between celestial bodies, and/or surface environments on celestial bodies having gravity lower than that of Earth (e.g., the Moon, Mars, asteroids, moons, planetesimal, etc.).

In view of the above and other considerations, embodiments of the present disclosure are directed to space-based clothing cleaning systems. In accordance with some embodiments of the present disclosure, carbon dioxide is used as cleaning fluid and replaces the need for water to be used for cleaning of clothing. This results in a waterless cleaning solution for both low Earth orbit and deep space missions where water may be scarce. At a minimum, such systems may enable reduced launch and resupply costs by enabling cleaning of clothing and thus reuse thereof, avoiding the need for resupply. Furthermore, such systems may reduce the total waste generation of a space mission. Further advantages and benefits of embodiments of the present disclosure will be apparent in view of the following discussion and description of various non-limiting embodiments of the present disclosure. Although a number of different embodiments will be described herein, it will be appreciated that features of the various embodiments may be interchanged and/or exchanged to result in one or more embodiments not expressly described but rather are encompassed by the spirit and scope of the disclosure. Further, additional features and structures may be incorporated into embodiments without departing from the scope of the present disclosure.

In accordance with embodiments of the present disclosure, carbon dioxide ($CO_2$) based cleaning systems for cleaning clothes are provided. The cleaning systems use liquid $CO_2$. Contaminants from dirty clothes are removed by the low viscosity and surface tension of the liquid $CO_2$. Once the cleaning process is completed, the pressure is reduced and the liquid $CO_2$ will be converted to a gas state, which can allow for scrubbing and removal of dirt, debris, and waste that is removed from the clothing during the cleaning process. The gas $CO_2$ may be reclaimed and the waste separated therefrom. The gas $CO_2$ may then be reused for subsequent cleaning processes or cycles. Embodiments of the present disclosure provide for a waterless solution for cleaning clothes in space. Further, in accordance with some embodiments, the cleaning process may occur at ambient (e.g., room) temperatures within an occupied space (e.g., cabin, crew quarters, etc. that are part of a vehicle, station, etc.). By using liquid $CO_2$ and operating at room temperature, clothing may be dried rapidly after a cleaning cycle or process without the application of heat or other external inputs/operations. The use of liquid $CO_2$ can result in cleaning of clothes that is more gentle than conventional water-based washing, which can result in increased life/longevity of clothing. This can result in extending the usable life of clothing, which in turn can reduce the total amount of clothing that is launched and carried aboard spacecraft and/or space-based stations and the like.

As noted, embodiments of the present disclosure are directed to waterless $CO_2$-based cleaning systems. Such systems may be closed-loop systems, where the $CO_2$ is recaptured, reclaimed, or otherwise recycled within the system. In some such closed-loop systems, a supplemental supply of $CO_2$ may be provided to ensure that necessary levels of $CO_2$ are maintained within the system and to provide a replenishment of $CO_2$ if losses occur, such as through evaporation, capture and disposal with waste removed from clothing, or the like. In other embodiments, the systems may be open-loop, where the $CO_2$ and waste are disposed of directly, without reclaiming of the $CO_2$. Further, some combination of closed- and open-loop may be employed, where a system typically operates as a closed-loop system, but may be converted to open-loop to dispose of used $CO_2$ and then a resupply of clean $CO_2$ may be provided, and then converted back to a closed-loop system. In some embodiments, additional chemicals and/or cleaning agents may be used to provide additional cleaning and/or deodorizing to clothes and/or of the system itself. In some embodiments, optional distillers and/or slug tanks may be employed to improve removal of residues, dirt, debris, and waste. Furthermore, it will be appreciated that, beyond what is shown and described herein, the systems may include additional valves, sensors, access ports, quick disconnects, fittings, pressure relief hardware, pressurization hardware, and/or purge hardware may be added to systems described herein. Such additional components may be used to aid in maintenance operations, cleaning operations, or the like, of such systems, as will be appreciated by those of skill in the art and in view of the teachings herein.

Referring to FIG. 1, illustrated is a schematic diagram of a cleaning system 100 in accordance with an embodiment of the present disclosure. The cleaning system 100 may be used onboard a spacecraft, space station, non-Earth station or base, or the like, which is subject to a microgravity environment. The cleaning system 100 of FIG. 1 is a closed-loop configuration that uses carbon dioxide ($CO_2$) for cleaning of clothing. The cleaning system 100 includes a holding tank 102 which is configured to contain liquid $CO_2$. The holding tank 102 may be a pressure tank, a bellows tank, a variable volume container, or the like, as will be appreciated by those of skill in the art. The holding tank 102 may be configured to ensure a high pressure is maintained such that $CO_2$ that is within the holding tank 102 is maintained in liquid form. In a flow direction along a flow path 104 from the holding tank 102 is a first pump 106 and a rotary cleaner 108 for receiving both laundry through a door 110 and liquid $CO_2$ from the primary flow path 104. The rotary cleaner 108 includes an internal drum 109 that is arranged within the rotary cleaner 108 and provides a mechanism to allow for separation of the liquid $CO_2$ from clothes during a cleaning operation of the cleaning system 100. Output from the rotary cleaner 108 may be liquid and/or gaseous $CO_2$. Downstream from the rotary cleaner 108, along the flow path 104, may be an optional first filter 112 and optional second pump 114, and then a distillation tank 116. Continuing along the flow path 104 may be an optional second filter 118, a compressor 120, and a condenser 122, before returning to the holding tank 102.

The cleaning system 100 may include additional components, which may be optional in this configuration. For example, as shown, a fluid connection from the rotary cleaner 108 may be provided to fluidly connect to an occupied space 124 (e.g., a cabin or crew quarters) and/or fluidly connect to an air outlet 126 which may include a third pump 128. Additionally, an auxiliary supply 130 may be provided to add additional $CO_2$ into the cleaning system 100. Furthermore, the condenser 112 may be arranged along the flow path 104, with the flow path 104 providing the $CO_2$ as a first working fluid within the condenser 122 and a coolant loop 132 providing a second working fluid within the condenser 122, and thus remove heat from the $CO_2$ as it passes through the condenser 122, as described herein. As shown and in this non-limiting configuration, the flow of $CO_2$, whether liquid or gas, through the cleaning system 100 may be controlled by a set of valves $V_1$-$V_9$. The valves $V_1$-$V_9$ may be passive (e.g., one-way valves, check valves, or the like) or may be active valves (e.g., solenoid valves, electronic valves, or the like), and each of the valves $V_1$-$V_9$ may be configured for manual or automated operation, depending on the specific configuration of the cleaning system 100. In some embodiments, a controller 134 may be provided for control and operation of the cleaning system 100, with the controller 134 operably connected to some or all of the valves $V_1$-$V_9$.

An example of operation of the cleaning system 100, in accordance with a non-limiting embodiment, will now be described. A user will open the door 110 to the rotary cleaner 108 and place soiled clothes into the internal drum 109. The internal drum 109 may be a perforated container or structure that is configured to rotate with rotation of the rotary cleaner 108. That is, the internal drum 109 and the rotary cleaner 108 may be commonly driven or may be a single structure that moves (rotates) as a single body. The structure of the internal drum 109 will contain the clothes as the internal drum 109 and rotary cleaner 108 are rotated. The internal drum 109 is perforated such that liquid $CO_2$ may pass through apertures, holes, perforations, or the like, and flow to a space external to the internal drum 109 and be collected on an internal surface of the rotary cleaner 108. With the clothes placed in the internal drum 109, the user will then close the door 110. When the door 110 is closed it will form a sealing engagement with the rotary cleaner 108 (or a housing thereof) or a sealing operation may be performed, such as a locking mechanism that provides a fluid seal at the door 110 to define a sealed internal volume within the rotary cleaner 108. In accordance with embodiments of the present disclosure, the rotary cleaner 108 is configured as a rotating centrifuge or rotary phase separator. This configuration enables cleaning of clothes in the absence of gravity and causes the separation of liquids and gasses within the rotary cleaner 108. Accordingly, embodiments described herein are directed to systems that are uniquely suited for a microgravity environment.

With the door 110 closed and the rotary cleaner 108 sealed, the valves $V_1$-$V_9$ may all be closed (if not already closed). When the clothes are inserted into the internal drum 109, and the door 110 is open, the internal volume of the rotary cleaner 108 will be filled with air and reach ambient (occupied space) pressure. For operation of the rotary cleaner 108 to perform a cleaning cycle with liquid $CO_2$, the air within the rotary cleaner must be removed. As such, the ninth valve $V_9$ will be opened. With the ninth valve $V_9$ open, the third pump 128 may be operated to draw down the pressure within the rotary cleaner 109 and extract the air therefrom. For example, the third pump 128 may be a vacuum pump that is used to remove the air from the rotary cleaner 108 and direct the extracted air to the air outlet 126. The air outlet 126 may provide fluid communication to an occupied space (e.g., cabin, crew quarters, etc.) and/or an air processing and filtration system. In other configurations, the third pump 128 may be omitted, and the ninth valve $V_9$ may be used to expose the internal volume of the rotary cleaner 108 to the vacuum of space, thus pulling the air within the internal volume of the rotary cleaner 108 out. Once the air has been removed from the rotary cleaner 108, the ninth valve $V_9$ will close.

Next, a fill operation is performed. In this operation, the first valve $V_1$ is opened and the first pump 106 is activated. The first pump 106 will operate to direct a flow of liquid $CO_2$ from the holding tank 102 through the first valve $V_1$ and into the internal volume of the rotary cleaner 108. As the liquid $CO_2$ enters the internal volume of the emptied rotary cleaner 108, the $CO_2$ will boil into gas. As the $CO_2$ is continued to be pumped into the rotary cleaner 108 by the first pump 106, the pressure will increase. When the gaseous form of $CO_2$ within the rotary cleaner 108 hits a threshold pressure level (e.g., about 700 psi), additional $CO_2$ that is input into the rotary cleaner 108 will remain in liquid form. Once at or above the threshold pressure level, the first pump 106 will continue to pump liquid $CO_2$ from the holding tank 102 into the rotary cleaner 108 until a specific, predetermined, or threshold fill level is reached. The fill level may be set based on various criteria, which may be load-specific, such that excess waste of materials and energy can be minimized. For example, sensors located within the rotary cleaner 108 may be used to measure the fill levels with the rotary cleaner 108. In other configurations, a preset or predetermined fill level or amount of $CO_2$ may be introduced into the rotary cleaner 108, which may be controlled by flow rate sensors, valves, pumps, and the like.

The introduction of $CO_2$ into the rotary cleaner 108 may be achieved by one or more input nozzles, which may be arranged about a periphery of the rotary cleaner 108, at an end (e.g., opposite the door 110), and/or through a dispensing shaft arranged axially within the rotary cleaner 108 and the internal drum 109. When a predetermined or threshold amount of liquid $CO_2$ has filled the rotary cleaner 108, the first pump 106 is turned off and the first valve $V_1$ is closed. At this point, the rotary cleaner 108 is fluidly sealed, with clothes held within the internal drum 109 and the rotary cleaner 108 filled with liquid $CO_2$.

Next, a cleaning cycle is performed. During the cleaning cycle, the liquid $CO_2$ and the dirty clothes will mix and interact. The low viscosity and surface tension of the liquid $CO_2$ provide a solvent which binds to dirt, debris, contaminants, soiling, and the like that is on the clothes. The rotary cleaner 108 is rotated by a driving mechanism, such as a rotary shaft or the like. As noted above, the internal drum 109 and the rotary cleaner 108 rotate in tandem, and as the internal drum 109 and rotary cleaner 108 rotate, the liquid $CO_2$ will be forced radially outward through the clothes, through the holes in the internal drum 109, and collect on an internal surface of the rotary cleaner 108 that is external to the internal drum 109. In some configurations, an agitator or other element, structure, or feature may be arranged within the internal drum 109 to cause additional interaction between the clothing and the liquid $CO_2$. In accordance with some embodiments, the cleaning cycle may be performed for a predetermined amount of time (e.g., cleaning cycle time).

When the cleaning cycle is complete (or at the same time), the distillation tank 116 will be pressurized. In this operation, the second valve $V_2$ is opened and the first pump 106 is operated. Because the first, third, fourth, eighth, and ninth valves $V_1$, $V_3$, $V_4$, $V_8$, $V_9$ are closed, the rotary cleaner 108 remains fluidly isolated. Accordingly, as the first pump 106 is operated, liquid $CO_2$ from the holding tank 102 may be directed through the second valve $V_2$ and into the distillation tank 116. Similar to pressurizing the rotary cleaner 108, the first pump 106 is operated for sufficient time to bring the pressure up within the distillation tank 116 such that liquid $CO_2$ is formed and then maintained therein (e.g., about 700 psi). As such, when additional $CO_2$ is added to the distillation tank 116, after bringing the pressure up, it will either convert to or remain as liquid $CO_2$. With the distillation tank 116 at or above the threshold pressure, the second valve $V_2$ will close.

As noted, the cleaning cycle may be performed before or during the pressurization of the distillation tank 116. When the distillation tank 116 is brought to pressure and the cleaning cycle is complete, the rotary cleaner 108 may continue to be rotationally driven. That is, after the cleaning cycle is complete, the rotary cleaner 108 will continue to spin.

With the rotary cleaner 108 spinning, the dirty liquid $CO_2$ within the rotary cleaner 108 may be drained. To drain the rotary cleaner 108, the distillation tank 116 is rotated, such as by a drive shaft or the like, as will be appreciated by those of skill in the art. With the distillation tank 116 spinning, the third valve $V_3$ is opened and the second pump 114 is activated. The second pump 114 is arranged between the rotary cleaner 108 and the distillation tank 116 and is arranged to cause the dirty liquid $CO_2$ within the rotary cleaner 108 to flow into the distillation tank 116. When the liquid $CO_2$ has been removed from the rotary cleaner 108 and directed into the distillation tank 116, the third valve $V_3$ will close. As shown, the flow path 104 between the rotary cleaner 108 and the distillation tank 116 may include the first filter 112. The first filter 112 may be an optional filter to remove debris such as lint or the like, and/or may be configured to pre-treat the $CO_2$ prior to being supplied into the distillation tank 116. As the distillation tank 116 is rotated, any contaminates that were picked up by the liquid $CO_2$ during the cleaning cycle will be removed from the $CO_2$. For example, while the distillation tank 116 is rotated, the pressure may be reduced and the temperature may be optionally increased, resulting in the liquid $CO_2$ to boil so that the $CO_2$ gas/vapor and contaminants are separated. The contaminants may then collect in the distillation tank 116 and the $CO_2$ gas/vapor may then be recondensed as clean liquid $CO_2$.

That is, with the $CO_2$ held within the distillation tank 116, a $CO_2$ recapture operation may be performed. In the $CO_2$ recapture operation, the fifth valve $V_5$ and the sixth valve $V_6$ are opened and the compressor 120 is activated. The compressor 120 will generate a low pressure to draw $CO_2$ out of the distillation tank 116 and direct the $CO_2$ to the condenser 122. The $CO_2$ extracted from the distillation tank 116 may be in gaseous form, and thus it must be converted back to liquid form prior to completing the closed-loop operation and suppling the $CO_2$ back into the holding tank 102. Accordingly, as the compressor 120 and the condenser 122 operate, the pressure of the gaseous $CO_2$ will be increased in the compressor 120 and the temperature decreased in the condenser 122, cause the gaseous $CO_2$ to condense and phase change to liquid $CO_2$ which is supplied back into the holding tank 102. The temperature of the $CO_2$ may be reduced within the condenser 122 by means of the second working fluid within the coolant loop 132 acting as a heat sink. The coolant loop 132 may be part of other systems of the spacecraft/station or may be a dedicated coolant loop for the cleaning system 100.

In this operation, the compressor 120 is operated until the distillation tank 116 is brought to the same pressure as the rotary cleaner 108. When the distillation tank 116 and the rotary cleaner 108 at the same pressure, the fourth valve $V_4$ is opened. The compressor 120 will continue to operate and pull $CO_2$ gas out of the rotary cleaner 108 and the distillation tank 116 until all gaseous $CO_2$ has been removed. Accordingly, by running the compressor 120 in this operation, $CO_2$ that is upstream from the compressor 120 (up to the rotary cleaner 108) will be pulled through the flow path 104 and supplied back to the holding tank 102. In some configurations, the compressor 120 may be operated to pull additional $CO_2$ into the cleaning system 100 from the auxiliary supply 130. To perform the replenishment operation, the seventh valve $V_7$ may be opened, and the pressure differential generated by the compressor 120 may pull liquid or gaseous supplemental $CO_2$ from the auxiliary supply 130 and the supplemental $CO_2$ may be provided through the compressor 120 and condenser 122 to add additional liquid $CO_2$ to the holding tank 102.

With the $CO_2$ removed from the rotary cleaner 108 and the distillation tank 116, the compressor 120 will be turned off, and the fifth valve $V_5$ will be closed. In some embodiments, the ninth valve $V_9$ may then be opened to expose the rotary cleaner 108 to vacuum or the third pump 128 is operated to remove any trace amounts of $CO_2$ that were not removed during the prior described operation. If such venting is performed by operation of the valve $V_9$, after such venting, the valve $V_9$ will then be closed. Whether the valve $V_9$ is operated or not, next the valve $V_4$ is closed and the rotary cleaner 108 and the distillation tank 116 stop rotating.

At this point, the clothes within the internal drum 109 of the rotary cleaner 108 will be clean, after having the liquid $CO_2$ bind, collect, and remove the contaminants. Next, the rotary cleaner 108 must be re-pressurized to ambient pressures to match the external environment of the occupied space and allow for a user to access the inside of the rotary cleaner 108. Accordingly, in this operation, the valve $V_8$ will be opened and air from the occupied space 124 may enter the rotary cleaner 108. This may occur passively because the rotary cleaner 108 was vented and potentially exposed to vacuum, resulting in a low pressure volume that will pull air from the occupied space into the rotary cleaner 108. In some configurations, an optional pump or the like may be used to assist in this re-pressurization step. The user may then open the door 110 to remove clean clothes from the internal drum 109 of the rotary cleaner 108.

Figure 2:
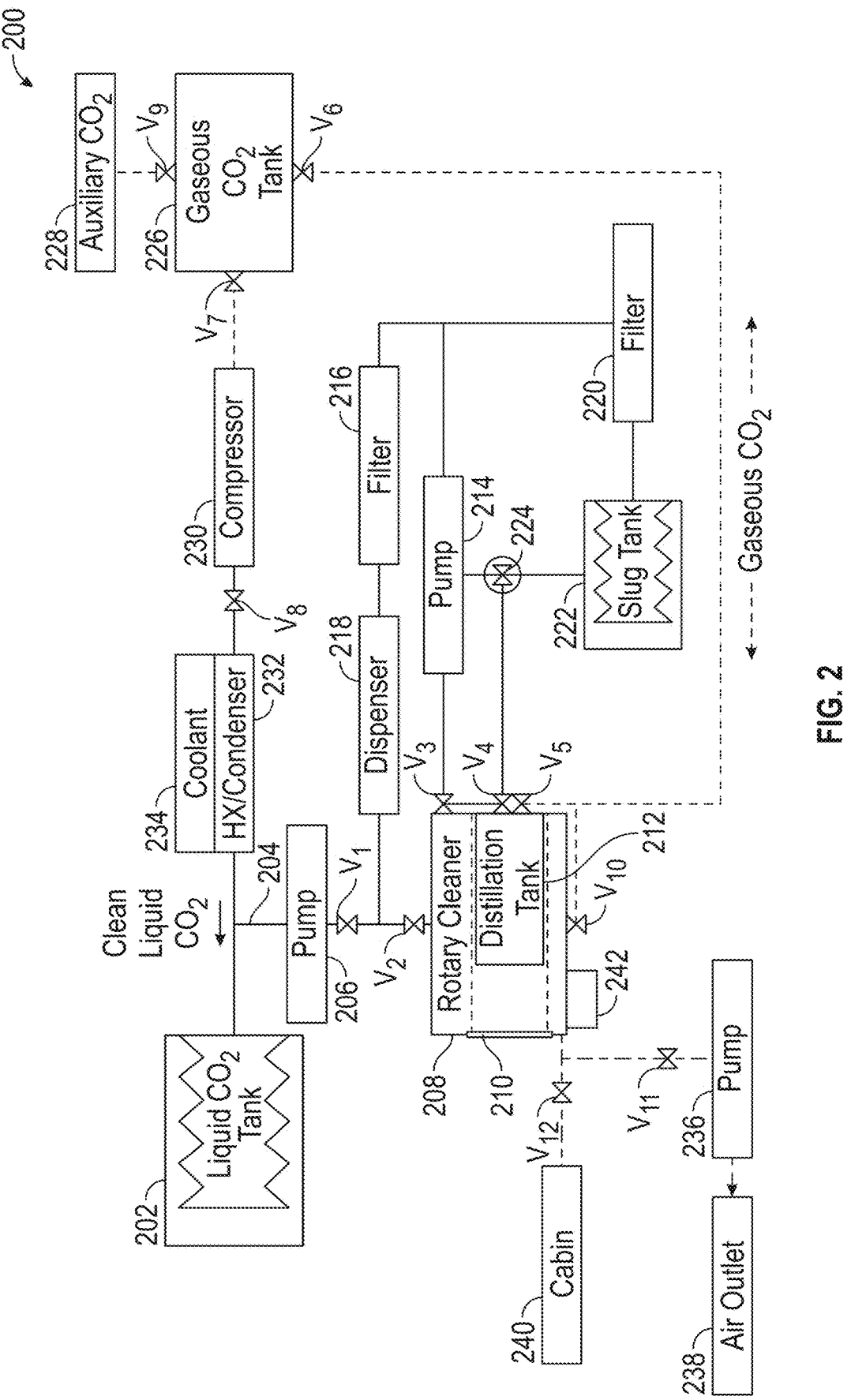
FIG. 2 is a schematic diagram of another embodiment of a closed-loop $CO_2$ cleaning system in accordance with an embodiment of the present disclosure.

Referring now to FIG. 2, illustrated is a schematic diagram of a cleaning system 200 in accordance with an embodiment of the present disclosure. The cleaning system 200 may be used onboard a spacecraft, space station, non-Earth station or base, or the like, which is subject to a microgravity environment. The cleaning system 200, similar to that of FIG. 1, is a closed-loop configuration that uses carbon dioxide ($CO_2$) for cleaning of clothing. The cleaning system 200 includes a holding tank 202 which is configured to contain liquid $CO_2$. In a flow direction along a flow path 204 from the holding tank 202 is a first pump 206 and a rotary cleaner 208 for receiving both laundry through a door 210 and liquid $CO_2$ from the holding tank 202. The rotary cleaner 208 includes an internal drum that is arranged within the rotary cleaner 208 similar to that shown and described above and further described with respect to FIGS. 3A-3B. In this configuration, a distillation tank 212 is arranged within the rotary cleaner 208. The distillation tank 212 may be arranged radially inward from the internal drum of the rotary cleaner 208 and may be configured to be rotationally driven in tandem or simultaneously with the rotary cleaner 208. That is, the distillation tank 212 may be arranged coaxially with the rotary cleaner 208. The distillation tank 212 may be maintained selectively fluidly separate from the rest of the cleaning cavity of the rotary cleaner 208. Output from the rotary cleaner 208 may be liquid and/or gaseous $CO_2$. It will be appreciated that in other configurations, a commonly mounted or coaxially arranged distillation tank may be provided that is not arranged within the rotary cleaner 208, but rather may be arranged to rotate on the same axis. The resulting system may be substantially similar to that of the cleaning system 100 shown in FIG. 1.

With the distillation tank 212 arranged within the rotary cleaner 208, the flow paths of the cleaning system 200 are different from that of the cleaning system 100 of FIG. 1. For example, a first output of the rotary cleaner 208 may be directed to a second pump 214, and then to a first filter 216 and a dispenser 218 along a first output path of the flow path 204 (e.g., during a cleaning cycle). A second output of the rotary cleaner 208 may be directed to the lower pressure distillation tank 212 (e.g., from valves $V_3$, $V_4$). After processing in the distillation tank 212, contaminants may be directed through a flow control element 224, and into a slug tank 222, a second filter 220, and then to the first filter 216, and the dispenser 218 along a first output path of the flow path 204 (e.g., optionally during a cleaning cycle or when the slug tank 222 is full). It will be appreciated that the slug tank 222 may be an optional component that is used to aid the distillation tank 212 in separation of contaminants from the $CO_2$. Then, gaseous $CO_2$ will be directed into a gaseous holding tank 226. From the gaseous holding tank 226, which may be supplemented with additional $CO_2$ from an auxiliary supply 228, the gaseous $CO_2$ can be converted back into liquid $CO_2$ by being compressed within a compressor 230 and cooled within a condenser 232 before being supplied back into the holding tank 202. Similar to the embodiment of FIG. 1, the condenser 232 may be fluidly coupled to a coolant loop 234. The cleaning system 200 further includes a venting assembly for the rotary cleaner 208. The venting assembly includes a fourth pump 236 that may be fluidly coupled between the rotary cleaner 208 and an air outlet 238 (or the vacuum of space) and/or the rotary cleaner 208 may be fluidly connected to an occupied space 240, similar to the configuration of FIG. 1.

As shown in this non-limiting configuration, the flow of $CO_2$ along the flow path 204, whether liquid or gas, through the cleaning system 200 may be controlled by a set of valves $V_1$-$V_{12}$. The valves $V_1$-$V_{12}$ may be passive (e.g., one-way valves, check valves, or the like) or may be active valves (e.g., solenoid valves, electronic valves, or the like), and each of the valves $V_1$-$V_{12}$ may be configured for manual or automated operation, depending on the specific configuration of the cleaning system 200. In some embodiments, a controller 242 may be provided for control and operation of the cleaning system 200, with the controller 242 operably connected to some or all of the valves $V_1$-$V_{12}$.

In operation, a user will open the door 210 of the rotary cleaner 208 and place soiled or dirty clothes within the internal drum of the rotary cleaner 208. The door 210 is then closed and sealingly engages to provide a fluid seal around the door 210. All valves $V_1$-$V_{12}$ are closed, and then the valve $V_{11}$ or the valve $V_{12}$, at an outlet to the rotary cleaner 208 and arranged between the rotary cleaner 208 and the occupied space 240 and the air outlet 238, respectively, is opened. In some configurations, the fourth pump 236 may be arranged between the rotary cleaner and each of the valves $V_{11}$ and $V_{12}$. The fourth pump 236 may be operated to remove air from the rotary cleaner 208 and direct air into the occupied space 240 and/or to an air processing and filtration system. In some embodiments, the rotary cleaner 208 may be exposed to a low pressure external environment, such as the vacuum of space, which may be assisted by the fourth pump 236. The process is used to evacuate any air from the cleaning cavity of the rotary cleaner 208. Once the air is removed, the valves $V_{11}$ and/or $V_{12}$, which may have been opened, will be closed.

Next, a fill operation is performed. It is noted that because this is a cyclical process, during the fill operation, the distillation tank 212 may already be filled from a prior cycle, or pre-filled during an initial installation and set up. The distillation tank 212 will contain liquid $CO_2$ at about 700 psi. During the fill operation, valves $V_{10}$ and $V_6$ are opened and the rotary cleaner 208 is filled with $CO_2$ received from the gaseous holding tank 226. The drawing of the $CO_2$ from the gaseous holding tank 226 and into the rotary cleaner 208 may be caused by a pressure differential achieved during the initial evacuation of air from rotary cleaner 208. The pressure within the rotary cleaner 208 may be monitored to ensure that the pressure reaches at least 75 psi. This operation may be performed to ensure that dry ice does not form within the rotary cleaner 208 and/or on the clothes within the rotary cleaner 208 and/or prevent thermal shock to the system 200 and components thereof. This step may be optional, but it may be used to ensure that the $CO_2$ within the rotary cleaner 208 is maintained in liquid form.

Next, valves $V_1$, $V_2$ are opened and the first pump 206 is activated. As the first pump 206 is operated, $CO_2$ from the holding tank 202 will be supplied into the cleaning cavity of the rotary cleaner 208. The liquid $CO_2$ will enter the low pressure rotary cleaner 208 and boil and transition into a gaseous state. As $CO_2$ continues to be supplied into the rotary cleaner 208, the pressure within the rotary cleaner 208 will increase. The pressure will reach a threshold value (e.g., about 700 psi) where additional input $CO_2$ will not boil, and thus will fill the rotary cleaner 208 as a liquid. That is, once the rotary cleaner 208 reaches the threshold pressure, the first pump 206 will continue to operate to direct liquid $CO_2$ from the holding tank 202 into the rotary cleaner 208 to reach a specified fill level and/or pressure level. Once the fill level is reached, valve $V_1$ is closed and valve $V_2$ remains open. Next valve $V_3$ is opened and the second pump 214 is operated.

This configuration results in a closed loop cycle from the rotary cleaner 208, through valve $V_3$, through the second pump 214, through the first filter 216, through the dispenser 218, through valve $V_2$, and then back into the rotary cleaner 208. The first filter 216 may be a lint or other debris filter to remove particulates or the like from the cycled $CO_2$. The dispenser 218 may be an optional component that may dispense detergent, deodorizer, or the like into the flow stream of $CO_2$ to promote better cleaning and/or to deodorize and/or remove odors from the $CO_2$ and/or clothes as the $CO_2$ with detergent/deodorizer (in this arrangement) is supplied back into the rotary cleaner 208 to continue cleaning the clothes within the internal drum of the rotary cleaner 208. The cleaning cycle is thus performed to remove soil, dirt, and the like from the clothes by operation of the liquid $CO_2$ being forced through the clothing as the rotary cleaner 208 rotates, as described above. Further, agitation of the clothing may be achieved through the rotation of the internal drum and/or other features, such as blades, vanes, ribs, protrusions, or the like arranged on the internal surface of the internal drum and/or by operation of an injection nozzle or the like for spraying the liquid $CO_2$ at the clothing in a radially outward direction (i.e., from the center of the internal drum and radially outward therefrom).

During the agitation process, the pressure and temperature in the rotary cleaner 208 will rise so that the warmer temperature of the liquid $CO_2$ surrounding the distillation tank 212, arranged within the rotary cleaner 208, will cause the liquid $CO_2$ inside the distillation tank 212 (e.g., from a previous cleaning cycle) to boil. An optional heating element may be provided to introduce additional heat to the distillation tank 212 to aid in the processing that occurs within the distillation tank 212. For example, as the liquid $CO_2$ within the distillation tank 212 vaporizes during the cleaning cycle and/or application of heat from the optional heater, soil, dye residue, and other contaminants are left behind. Because the distillation tank 212 is rotated, with the rotary cleaner 208, the liquid and solid contaminants contained in the $CO_2$ will be collected on the internal surface of the distillation tank 212 and gaseous $CO_2$ will be substantially maintained radially inward therefrom. The rotary cleaner 208 will continue to spin through the remainder of the cleaning cycle.

Next, the distillation tank 212 will be depressurized. The depressurization of the distillation tank 212 is initiated by opening valve $V_4$ and the flow control element 224 is operated. In some embodiments, the flow control element 224 may be a valve, and in other configurations, the flow control element 224 may be a pump or other fluid motive driver or the like (e.g., a third pump). The flow control element 224 will cause any residue contained within the distillation tank 212 to be extracted and conveyed into the slug tank 222. The slug tank 222 may be a pressure vessel and, in some embodiments, may be a bellow or other variable volume container. Once the residue or contaminants within the distillation tank 212 are removed, the valve $V_4$ is closed. Next valves $V_5$, $V_6$ are opened and gaseous $CO_2$ from the distillation tank 212 flows into the gaseous holding tank 226. At the end of this part of the process, the distillation tank 212 may be substantially emptied of both liquid/solid wastes which are extracted to the slug tank 222 and gas which is extracted to the gaseous holding tank 226. In some configurations, the gas may not be extracted until a final purge operation, such as after multiple (e.g., 3 or more) repetitions of dilution. Maintaining the distillation tank pressurized with gas throughout the dilution process may assist in preventing dry ice and/or thermal shock within the distillation tank 212 and/or to ensure and maintain the $CO_2$ in a liquid state as it is directed into the distillation tank 212.

The distillation tank 212 is then re-pressurized. Valves $V_3$, $V_4$ may be provided between the distillation tank 212 and the cleaning cavity of the rotary cleaner 208. It is noted that $CO_2$ remains a liquid at room temperature between the pressures of about 75 psi to about 1075 psi. Therefore, the pressure difference between rotary cleaner 208 and the distillation tank 212 is such that when the valve $V_4$ is opened or operated, both the rotary cleaner 208 and the distillation tank 212 must still be both at a pressure where $CO_2$ can remain a liquid. It will be appreciated that the pressure of the distillation tank 212 will never exceed the pressure of the rotary cleaner 208, and thus flow of fluids from the distillation tank 212 to the rotary cleaner 208 is prevented. The specific pressures of the system and components thereof may depend on the size and/or volume of the rotary cleaner 208 and distillation tank 212, the amount of $CO_2$, the amount of clothing, and/or based on other considerations of the system and/or use thereof.

To perform the re-pressurization, the valve $V_4$ is opened or operated and the distillation tank 212 is filled with liquid $CO_2$ and soil/residue from the rotary cleaner 208. During this operation, the rotary cleaner 208 and the distillation tank 212 will equalize in pressure (e.g., between 75 psi and 1075 psi) and the $CO_2$ will remain in liquid form. The valve $V_4$ is then closed or deactivated. The rotary cleaner 208 will then be brought up to a threshold pressure and/or specified fill level, with clean liquid $CO_2$, in order to both dilute the contaminated liquid $CO_2$ and to maintain the pressure range between the rotary cleaner 208 and the distillation tank 212 to ensure that the $CO_2$ remains in liquid phase through several repetitions of dilution (e.g., multiple repetitions of depressurization/re-pressurization). The depressurization step may then be performed again to remove residue/soil and gas from the distillation tank 212. Depending on the volume of the distillation tank 212, the re-pressurization/depressurization step may be repeated multiple times (e.g., three or more), during a cleaning cycle. For example, after repeated cycles, the liquid $CO_2$ will be diluted enough to proceed with depressurization of the rotary cleaner 208 without risk of re-contamination of the clothes. After the last repetition/cycle, the rotary cleaner 208 may not be repressurized. The distillation tank 212 can then be depressurized/repressurized until all of the liquid $CO_2$ has been purged and all that is left is the gas. Then, a final purge of the remaining gases may occur, as described herein.

The slug tank 222, in combination with the flow control element 224, can push the residue/soil through the second filter 220 (e.g., a carbon filter), the first filter 216 (e.g., lint filter), and the dispenser 218. This allows for trace liquid $CO_2$ that was captured in the soil/residue extraction step. The slug tank 222 may be an optional component that is used to supplement residue/soil removal, and in some embodiments the slug tank may not be employed. Next, valves $V_2$, $V_3$ are closed.

Next, with valves $V_{10}$, $V_6$ open, any remaining gaseous $CO_2$ within the rotary cleaner 208 may be pulled into the gaseous holding tank 226. This operation may depressurize the rotary cleaner 208. After depressurization, valves $V_{10}$, $V_6$ are closed.

Next, gaseous $CO_2$ is reclaimed or recaptured. In this operation, valve $V_7$ is opened and the compressor 230 is operated. The compressor 230 will pull gaseous $CO_2$ from the gaseous holding tank 226 and direct the gaseous $CO_2$ to the condenser 232. The condenser 232 will convert high pressure gaseous $CO_2$ from the compressor 230 to the liquid state and ensure all $CO_2$ being directed back into the holding tank 202 will be in liquid form. It is noted that a pressure balance between the gaseous holding tank 226 and the rotary cleaner 208 is regulated by valve $V_7$, the compressor 230, and the holding tank 202, using pressure gauges, regulators, and the like which may be controlled by the controller 242. Gas is moved by going from a high pressure area to a low pressure area. To move gas from the rotary cleaner 208 to the gaseous holding tank 226, pressure must be higher in the rotary cleaner 208 and lower in the gaseous holding tank 226, and may be performed as described above. To move gas from the gaseous holding tank 226 to the rotary cleaner 208, the pressure must be higher in the gaseous holding tank 226 than the rotary cleaner 208, and may be performed as described above. The compressor 230 will be operated to pull gas from the gaseous holding tank 226 to regulate pressure balance, and then the compressor 230 is turned off and valve $V_7$ is closed.

At this point the rotary cleaner 208 will stop spinning. The rotary cleaner 208 may then be repressurized to ambient (e.g., pressure of occupied space 240) to allow for opening of the door 210 and removal of cleaned clothes. Optionally, or if necessary, valve $V_{11}$ may be opened and the fourth pump 236 operated to remove any final amounts of gaseous $CO_2$ from the rotary cleaner 208 or by fluidly coupling to the vacuum of space, prior to re-pressurization of the rotary cleaner 208 to ambient pressures. The re-pressurization may be achieved by opening valve $V_{12}$ which allows air from the occupied space 240 to enter the empty rotary cleaner 208. As a final optional step, the compressor 230 may be operated with valves $V_7$, $V_8$ open, but all other valves closed, to allow for replenishment of $CO_2$ into the holding tank 202 from the auxiliary supply 228.

Figures 3A, 3B:
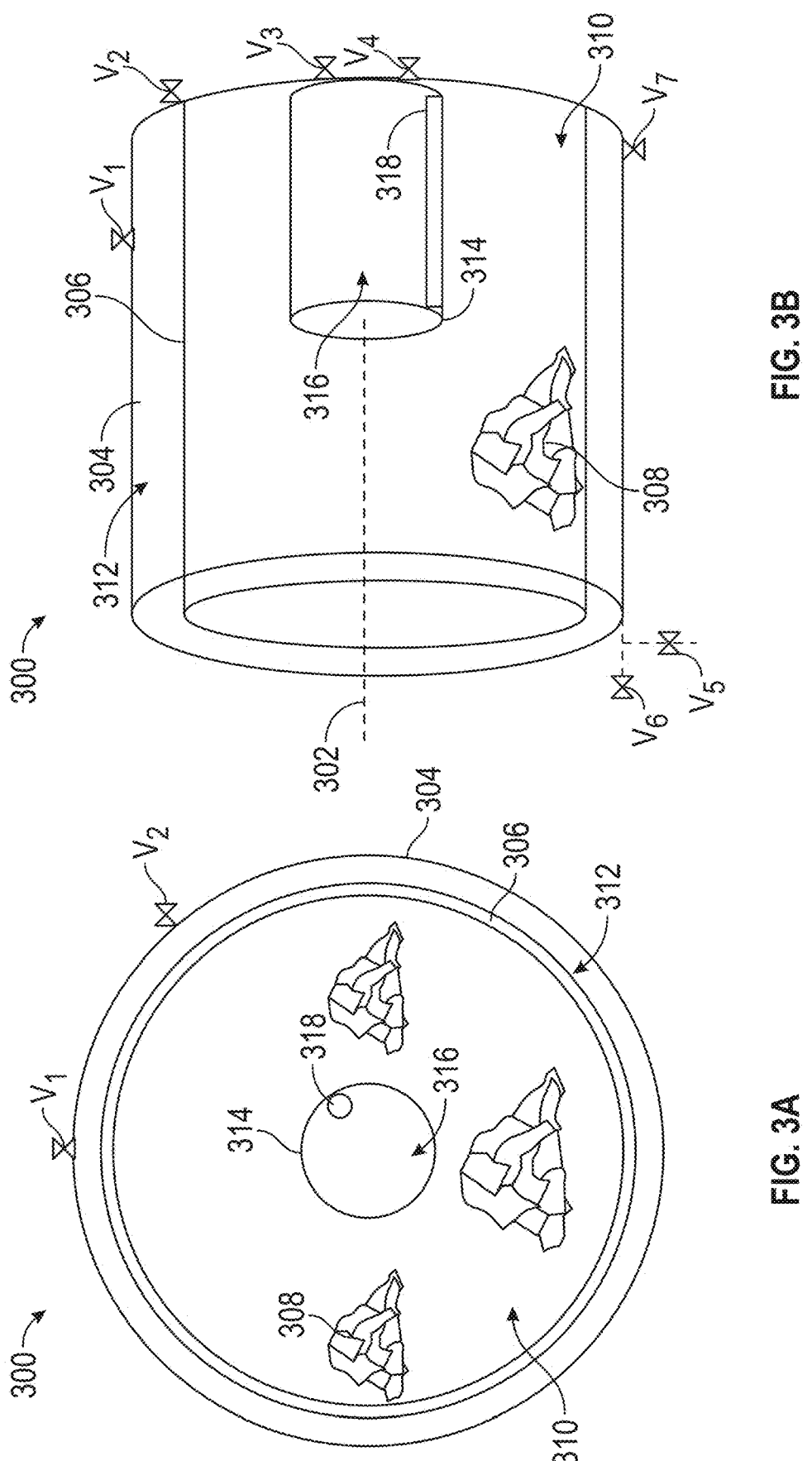
FIG. 3A is a front elevation schematic of a rotary cleaner in accordance with an embodiment of the present disclosure.
FIG. 3B is a side elevation view of the rotary cleaner of FIG. 3A.

Referring now to FIGS. 3A-3B, schematic illustrations of a rotary cleaner 300 in accordance with an embodiment of the present disclosure are shown. FIG. 3A illustrates a front elevation view of the rotary cleaner 300 and FIG. 3B illustrates a side elevation view thereof. The rotary cleaner 300 may be incorporated into the various embodiments shown and described herein or with other cleaning systems, as will be appreciated by those of skill in the art. The rotary cleaner 300 is configured to rotate about a central axis 302 and includes an outer housing 304 and an internal drum 306 arranged radially inward from the outer housing 304. The internal drum 306 may have holes, perforations, openings, a grating, a mesh configuration, or the like, which is selected to allow liquid $CO_2$ and bonded debris/soil to pass through, but to otherwise hold clothing 308 within the internal drum 306 and to prevent the clothing 308 from contacting the outer housing 304. The rotary cleaner 300 defines a cleaning cavity 310 defined within the internal drum 306 and annular cavity 312 radially between an external surface of the internal drum 306 and an internal surface of the outer housing 304. A set of valves $V_1$-$V_7$ are provided to enable fluid communication between the rotary cleaner 300 and other components of a cleaning systems, as shown and described herein.

Arranged within the internal drum 306 and arranged along the central axis 302 is a distillation tank 314. The distillation tank 314 defines a distillation cavity 316 therein. The distillation tank 314 may be a solid walled structure such that the distillation cavity 316 may be fluidly separated from the cleaning cavity 310. However, fluid coupling may be enabled between the distillation cavity 316 and the cleaning cavity 310 by selective operation of valve $V_3$. The distillation tank 314 may be fixedly mounted to, attached to, or otherwise part of the rotary cleaner 300 such that rotation of the rotary cleaner 300 causes simultaneous rotation of the distillation tank 314. As noted above, during operation of a rotary cleaner having an internal distillation tank, such as shown in FIGS. 3A-3B, heat may be generated within the cleaning cavity 310 which in turn can heat the distillation tank 314 and any contents therein (e.g., liquid $CO_2$ may be heated and boiled). In some embodiments, and optional heating element 318 may be provided to apply additional heat to or within the distillation tank 314. Valves $V_1$-$V_2$ may be operated during a cleaning cycle, valves $V_3$-$V_4$ may be used during operation of the distillation tank 314 (e.g., pressurization, depressurization, extraction of soil, extraction of liquid or gas $CO_2$, or the like), and valves $V_5$-$V_7$ may be used to depressurize (e.g., by pump or vacuum) or pressurize (e.g., via occupied space air) the rotary cleaner 300.

Figure 4:
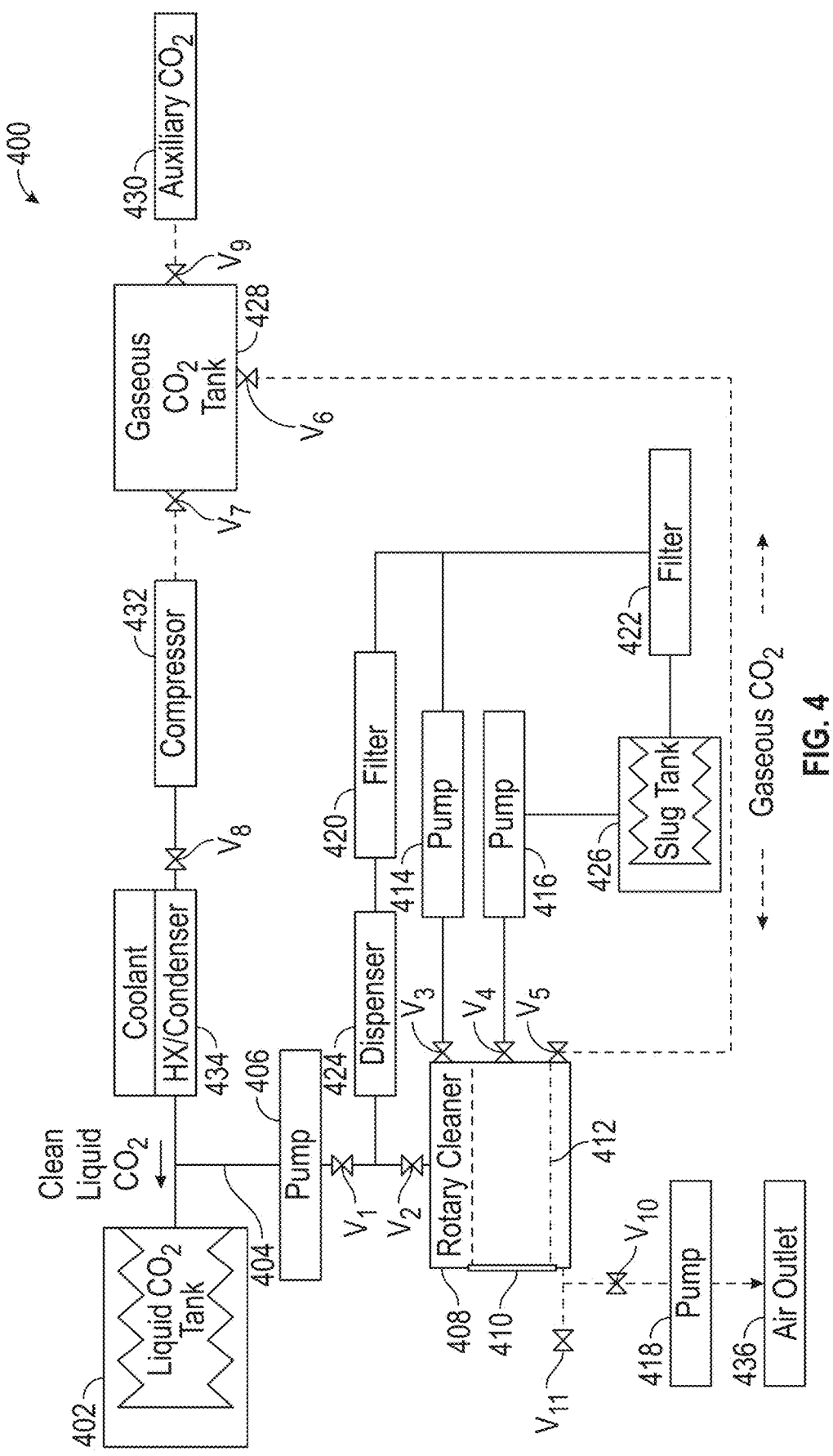
FIG. 4 is a schematic diagram of another embodiment of a closed-loop $CO_2$ cleaning system in accordance with an embodiment of the present disclosure.

FIG. 4 is a schematic illustration of another configuration of a cleaning system 400 in accordance with an embodiment of the present disclosure. The cleaning system 400, similar to that of FIGS. 1-2, is a closed-loop configuration that uses carbon dioxide ($CO_2$) for cleaning of clothing, although in this configuration there is no distillation tank. The cleaning system 400 includes a holding tank 402 which is configured to supply liquid $CO_2$ in a flow direction along a flow path 404 from the holding tank 402. A first pump 406 and a rotary cleaner 408 are provided for receiving both laundry through a door 410 and liquid $CO_2$ from the holding tank 402. The rotary cleaner 408 includes an internal drum 412, as shown and described above. The cleaning system 400 further includes various pumps 414, 416, 418, filters 420, 422, an optional dispenser 424 for detergent/deodorizer, a slug tank 426, a gaseous holding tank 428, an auxiliary supply 430 of $CO_2$, a compressor 432, and a condenser 434. As shown in this non-limiting configuration, the flow of $CO_2$ along the flow path 404, whether liquid or gas, through the cleaning system 400 may be controlled by a set of valves $V_1$-$V_{11}$, which may be controlled by a controller or the like, as described above. Further, the rotary cleaner 408 may be selectively fluidly coupled to an air outlet 436 through the valve $V_{10}$ and a pump 418.

In operation of the cleaning system 400, the door 410 may be opened and a user may place soiled clothing within the internal drum 412 of the rotary cleaner 408. The door 410 may then be closed and seal the cleaning cavity of the rotary cleaner 408. All valves $V_1$-$V_{11}$ are closed. Valve $V_{10}$ or valve $V_{11}$ is opened to depressurize the rotary cleaner 408. For example, valve $V_{10}$ may be opened and pump 418 operated to remove air from the rotary cleaner 408, which can be evacuated to space, extracted and sent to a processing system, or may be otherwise directed through the air outlet 436. Valve $V_{10}$ is then closed.

With the clothing in the evacuated rotary cleaner 408, a fill operation is performed. First, as an optional step, valves $V_5$, $V_6$ are opened, and gaseous $CO_2$ from the gaseous holding tank 428 will fill the low pressure rotary cleaner 408. The pressure will slowly increase within the rotary cleaner 408 to a level of at least 75 psi, to prevent formation of dry ice within the rotary cleaner 408. Then valves $V_5$, $V_6$ are closed. Next, valves $V_1$, $V_2$ are opened to permit a fluid connection between the holding tank 402 and the rotary cleaner 408. A pump 406 is operated to draw liquid $CO_2$ from the holding tank 402 and direct it into the rotary cleaner 408. As described above, at first the liquid $CO_2$ will boil due to the low pressure within the rotary cleaner 408, but as the rotary cleaner 408 is filled, the pressure will increase to levels sufficient to ensure additional added $CO_2$ will remain in liquid form (e.g., about 700 psi). Once at pressure, the pump 406 will operate until the rotary cleaner 408 is filled to a specified level, and then the valve $V_1$ is closed.

Next, valve $V_3$ is opened and a pump 414 is operated to cycle the liquid $CO_2$ from the rotary cleaner 408 through a filter 420 and optional dispenser 424 for adding a detergent, deodorizer, or the like, and then back into the rotary cleaner 408. The cleaning cycle is then performed by rotating the rotary cleaner 408 such that liquid $CO_2$ will be driven radially outward through the clothing and internal drum 412 to collect soil, debris, waste, dirt, and the like from the clothing. When the cleaning cycle is complete, the rotary cleaner 408 will continue to spin, ensuring that the dirty liquid $CO_2$ does not interact with the clothing (e.g., spins to keep the liquid $CO_2$ in an annular cavity radially external to the internal drum 412).

The dirty $CO_2$ (e.g., soil and residue that is captured by the liquid $CO_2$ during the cleaning cycle) may then be removed from the rotary cleaner 408. Valve $V_4$, connected to the annular cavity of the rotary cleaner 408, is opened and a pump 416 is operated to draw residue and soil from the rotary cleaner 408 and into the slug tank 426. Once the contaminants, soil, residue, etc. is flushed from the rotary cleaner 408, the valve $V_4$ is closed. It is noted that at the beginning of the next cycle, the slug tank 426 can be configured to push the residue, soil, debris, etc., through the filters 422, 420, and the dispenser 424 to allow for capture any $CO_2$ that may have been pulled into the slug tank 426. As an optional step, valves $V_1$, $V_2$ may be opened and the rotary cleaner 408 is refilled with liquid $CO_2$ to a specified fill level and/or pressure threshold. This process may be repeated to dilute the contaminated liquid $CO_2$. In a variation on the present configuration, similar to FIG. 2, a single pump (e.g., pump 414) may be used, and pump 416 may be eliminated. In such a configuration, the valve $V_4$ may be arranged between the pump 414 and the slug tank 426. Once the liquid $CO_2$ has been removed from the rotary cleaner 408, valve $V_4$ will close.

Next, valves $V_5$, $V_6$ are opened and used to move any $CO_2$ within the rotary cleaner 408 to the gaseous holding tank 428 (e.g., by mechanism of pressure differentials or a pump). This operation will depressurize the rotary tank 408. Once depressurization is complete, valves $V_5$, $V_6$ will close.

The $CO_2$ gas will then be recaptured by opening valve $V_7$. The compressor 432 is operated to remove gaseous $CO_2$ from the gaseous holding tank 428 and sending it through the compressor 432 and condenser 434 and back to the holding tank 402 as liquid $CO_2$. The compressor 432 is operated until pressure regulation is achieved. The pressure balance between the gaseous holding tank 428 and the rotary cleaner 408 is regulated by valve $V_7$, the compressor 432, and the holding tank 402. Gas is moved by going from a high pressure area to a low pressure area. To move gas from the rotary cleaner 408 to the gaseous holding tank 428, the pressure must be higher in the rotary cleaner 408 and lower in the gaseous holding tank 428. To move gas from the gaseous holding tank 428 to the rotary cleaner 408, the pressure must be higher in the gaseous holding tank 428 than in the rotary cleaner 408. The compressor 432 will then be deactivated and valve $V_7$ will close. The rotary cleaner 408 may then stop spinning. The rotary cleaner 408 is repressurized by opening valve $V_{11}$ which can introduce ambient air/pressure into the rotary cleaner 408. Optionally, prior to introduction of air through valve $V_{11}$, valve $V_{10}$ may be opened to evacuate any excess $CO_2$ to space (vacuum) and/or a pump 418 may be operated to extract the leftover $CO_2$. Once the ambient air is introduced into the rotary cleaner 408, the door 410 may be opened to remove the cleaned clothing. The compressor 432 may also be optionally operated, in combination with opened valves $V_7$, $V_8$ to draw additional $CO_2$ from the auxiliary supply 430 to replenish the $CO_2$ within the holding tank 402.

Figure 5:
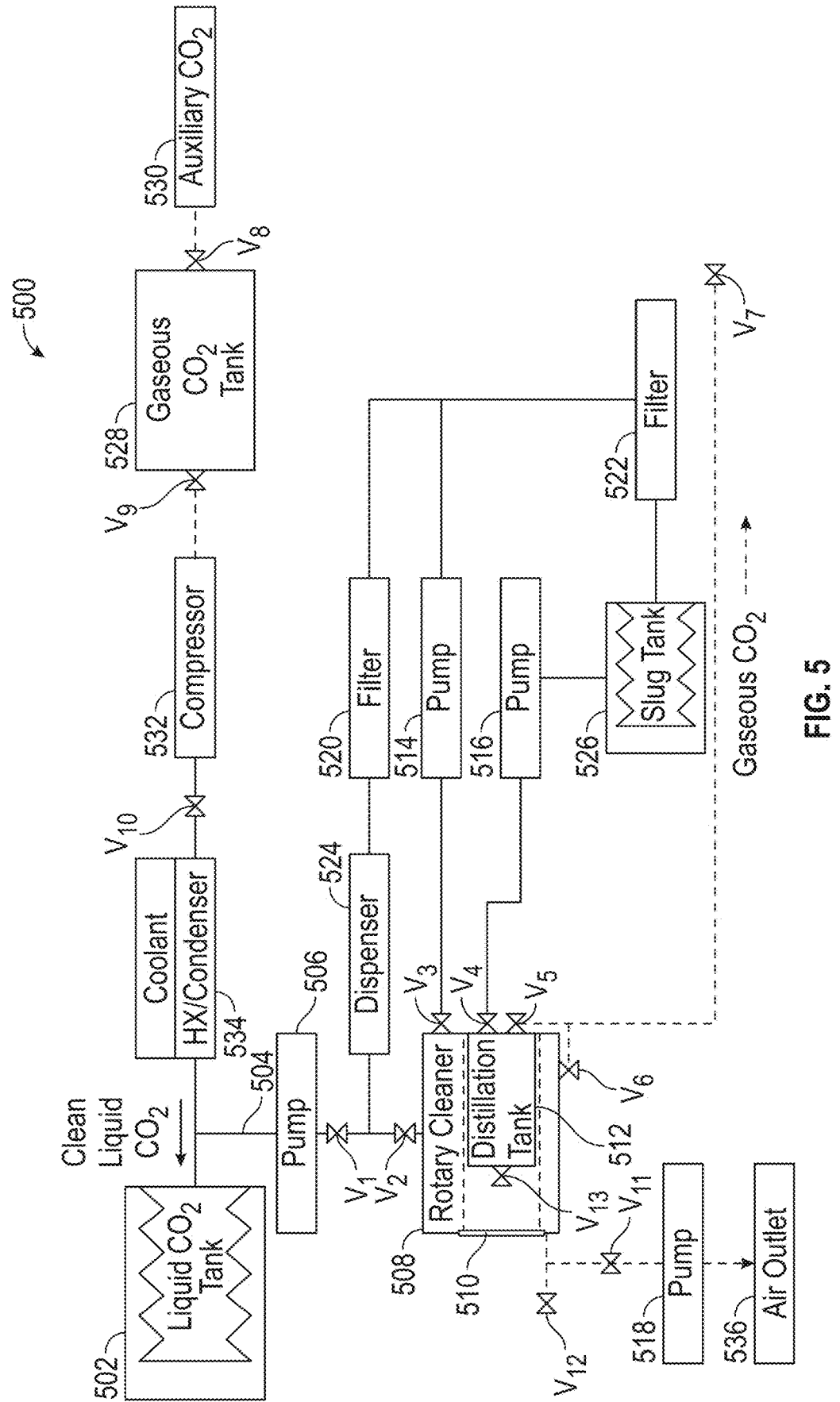
FIG. 5 is a schematic diagram of an embodiment of an open-loop $CO_2$ cleaning system in accordance with an embodiment of the present disclosure.

In the above described configurations, the cleaning systems 100, 200, 400 are arranged as closed-loop systems. However, such closed-loop arrangement is not required and various embodiments of the present disclosure may be open-loop. For example, with reference to FIG. 5, a schematic diagram of an open-loop cleaning system 500 in accordance with an embodiment of the present disclosure is shown. The cleaning system 500 is arranged substantially similar to that shown and described with respect to FIG. 2, but in an open-loop arrangement.

The cleaning system 500 includes a holding tank 502 which is configured to supply liquid $CO_2$ in a flow direction along a flow path 504 from the holding tank 502. A first pump 506 and a rotary cleaner 508 are provided for receiving both laundry through a door 510 and liquid $CO_2$ from the holding tank 502. The rotary cleaner 508 includes an internal drum, as shown and described above, and an internal distillation tank 512. The cleaning system 500 further includes various pumps 514, 516, 518, filters 520, 522, an optional dispenser 524 for detergent/deodorizer, a slug tank 526, a gaseous holding tank 528, an auxiliary supply 530 of $CO_2$, a compressor 532, and a condenser 534. As shown in this non-limiting configuration, the flow of $CO_2$ along the flow path 504, whether liquid or gas, through the cleaning system 500 may be controlled by a set of valves $V_1$-$V_{13}$, which may be controlled by a controller or the like, as described above. Further, the rotary cleaner 508 may be selectively fluidly coupled to an air outlet 536 through valve $V_{11}$ and a pump 518. In this non-closed-loop configuration, $CO_2$ that is pulled from the rotary cleaner 508 may be collected in a separate system and/or ejected to vacuum or otherwise disposed of through valve $V_7$, as shown.

In operation of the cleaning system 500, a user may open the door 510 and place clothes within the internal drum of the rotary cleaner 508. The door 510 is then closed and sealed. All valves $V_1$-$V_{13}$ are closed, and then valve $V_{11}$ is opened to evacuate the rotary cleaner 508 of air, and then valve $V_{11}$ is closed. The rotary cleaner 508 is then filled with liquid $CO_2$ in a similar fashion as described above by opening valves $V_1$, $V_2$ and pumping $CO_2$ from the holding tank 502 into the rotary cleaner 508 until a threshold pressure is reached and liquid $CO_2$ will fill the rotary cleaner 508 to a specified level and/or pressure level. A cleaning cycle with valves $V_2$, $V_3$ open and valve $V_1$ closed may be performed with pump 514 pumping the liquid $CO_2$ through filter 520 and dispenser 524, which can introduce detergent and/or deodorizers and the like. Once the cleaning is complete, the rotary cleaner 508 will be rotationally driven and continue spinning, as described above. Next, the distillation tank 512, which was warmed during the cleaning operation, can be depressurized by opening valve $V_4$ and operating pump 516 or performed as otherwise described herein (e.g., with respect to FIG. 2). In a variation on the present configuration, similar to FIG. 2, a single pump (e.g., pump 514) may be used, and pump 516 may be eliminated. In such a configuration, an additional valve may replace the pump 516 between the valve $V_4$, the pump 514, and the slug tank 526. Further, in some such configurations, an additional fluid connection may be provided between valves $V_3$, $V_4$. The contents of the distillation tank 512 may be directed into the slug tank 526. Once the contaminants withing the distillation tank 512 are removed, the pump 516 may be turned off and the valve $V_4$ is closed. Valve $V_5$ may then be opened and closed to vent gaseous $CO_2$ and then reseal the distillation tank 512.

The distillation tank 512 will then be repressurized by opening valve $V_{13}$, which is connected to the annular cavity of the rotary cleaner 508, to fluidly couple and equalize the pressure between the rotary cleaner 508 and the distillation tank 512. When valve $V_{13}$ is opened, liquid $CO_2$ will enter the distillation tank 512 from the rotary cleaner 508. As the liquid $CO_2$ flows into the distillation tank 512, it will carry any soil, debris, etc. that was picked up from the clothing during the cleaning cycle. In a non-limiting example, the distillation tank 512 and the rotary cleaner 508 may equalize around between 75 psi and 1075 psi, which ensures that the $CO_2$ remains in liquid form. Valve $V_{13}$ is then closed, sealing the distillation tank 512 from the rotary cleaner 508. In some configurations, depressurization and re-pressurization of the distillation tank may be performed multiple times to remove residue/gas. The slug tank 526 can then push the residue through the filters 522, 520, and the dispenser 524, and trace liquid $CO_2$ may be recovered during the next cleaning cycle. Valves $V_2$, $V_3$ are then closed. Valve $V_6$ can then be opened to remove any $CO_2$ gas still presented within the rotary cleaner 508, and then closed again. At this point the cleaning cycle and processing is complete, and the rotary cleaner 508 may be pressurized, as described above, and the clean clothes may be removed.

Figure 6:
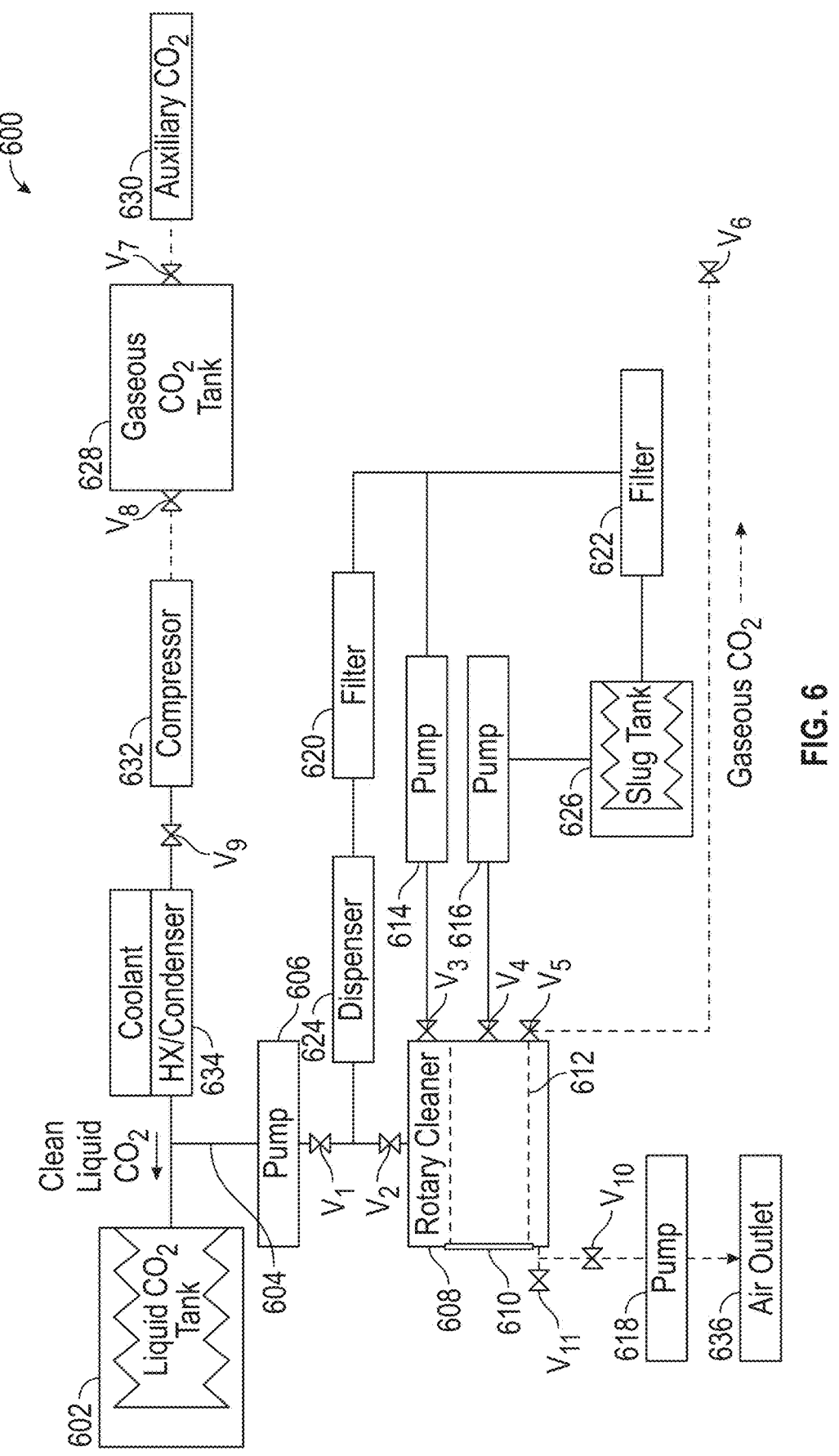
FIG. 6 is a schematic diagram of another embodiment of an open-loop $CO_2$ cleaning system in accordance with an embodiment of the present disclosure.

Referring now to FIG. 6, another open-loop configuration of a cleaning system 600 in accordance with an embodiment of the present disclosure is shown. The cleaning system 600 includes a holding tank 602 which is configured to supply liquid $CO_2$ in a flow direction along a flow path 604 from the holding tank 602. A first pump 606 and a rotary cleaner 608 are provided for receiving both laundry through a door 610 and liquid $CO_2$ from the holding tank 602. The rotary cleaner 608 includes an internal drum 612, and the cleaning system 600 does not include a distillation tank. The cleaning system 600 further includes various pumps 614, 616, 618, filters 620, 622, an optional dispenser 624 for detergent/deodorizer, a slug tank 626, a gaseous holding tank 628, an auxiliary supply 630 of $CO_2$, a compressor 632, and a condenser 634. As shown in this non-limiting configuration, the flow of $CO_2$ along the flow path 604, whether liquid or gas, through the cleaning system 600 may be controlled by a set of valves $V_1$-$V_{11}$, which may be controlled by a controller or the like, as described above. Further, the rotary cleaner 608 may be selectively fluidly coupled to an air outlet 636 through valve $V_{10}$ and a pump 618. In this non-closed-loop configuration, $CO_2$ that is pulled from the rotary cleaner 608 may be collected in a separate system and/or ejected to vacuum or otherwise disposed of through valve $V_6$, as shown.

In operation of the cleaning system 600, a user may open the door 610 and place clothes within the internal drum 612 of the rotary cleaner 608. The door 610 is then closed and sealed. All valves $V_1$-$V_{11}$ are closed, and then valve $V_{10}$ is opened to evacuate the rotary cleaner 608 of air, and then valve $V_{10}$ is closed. The rotary cleaner 608 is then filled with liquid $CO_2$ in a similar fashion as described above by opening valves $V_1$, $V_2$ and pumping $CO_2$ from the holding tank 602 into the rotary cleaner 608 until a threshold pressure is reached and liquid $CO_2$ will fill the rotary cleaner 608 to a specified level and/or pressure level. A cleaning cycle with valves $V_2$, $V_3$ open and valve $V_1$ closed may be performed with pump 614 pumping the liquid $CO_2$ through filter 620 and dispenser 624, which can introduce detergent and/or deodorizers and the like. Once the cleaning is complete, the rotary cleaner 608 will be rotationally driven and continue spinning, as described above. Next, residue is removed by opening valve $V_4$, which is connected to the annular cavity of the rotary cleaner 608, and pump 616 is operated to direct the residue from the rotary cleaner 608 into the slug tank 626 or performed as otherwise described herein (e.g., with respect to FIG. 2). In a variation on the present configuration, similar to FIG. 2, a single pump (e.g., pump 614) may be used, and pump 616 may be eliminated. In such a configuration, the valve $V_4$ may be arranged between the pump 614 and the slug tank 626. Once contaminants are flushed out of the rotary cleaner 608, the valve $V_4$ is closed. At the beginning of the next cleaning cycle any residue within the slug tank 626 can be pushed through the filters 622, 620 and conditioned at the dispenser 624, to allow for recovery of any remaining liquid $CO_2$ that was held in the slug tank 626. Valves $V_5$, $V_6$ can be opened to vent any remaining gaseous $CO_2$ in the rotary cleaner 608 into space or otherwise may be pumped out of the cleaning system 600. The rotary cleaner 608 is then repressurized by opening valve $V_{11}$, and the clean clothes may be removed.

As noted, each of the cleaning systems 500, 600 is an open-loop configuration. That is, the gaseous $CO_2$ that is extracted from the rotary cleaner 508, 608 after the cleaning cycle may be drawn out and disposed by opening a respective valve and venting to atmosphere, vacuum, or the like, or the $CO_2$ may otherwise be extracted for other uses or systems. In these configurations, the $CO_2$ is not actively reclaimed within the cleaning systems 500, 600. However, additional $CO_2$ may be introduced to replenish the respective cleaning systems 500, 600 from auxiliary supplies 530, 630, with the compressors 532, 632 and the condensers 534, 634 used to convert gaseous $CO_2$ to a liquid state prior to being directed into the respective holding tanks 502, 602. The cleaning systems 500, 600 may be configured for use in environments where $CO_2$ may be extracted from a local atmosphere or other local source (e.g., on a planetary body or the like, such as the atmosphere of Mars with 95% $CO_2$). In such situations, a closed-loop system may not be necessary. As such, the complexity of the cleaning system may be reduced by eliminating the closed-loop nature of the embodiments of FIGS. 1, 2, and 4.

In view of the above, embodiments of the present disclosure are directed to cleaning systems for clothing and other fabrics (e.g., bedding, towels, etc.) that can be used in microgravity environments. The cleaning systems employ a rotary cleaner and liquid $CO_2$ as a cleaning agent that will bind to soil, debris, waste, dirt and the like and pull it off the clothing as the rotary cleaner rotates. The use of an internal drum that is porous to liquid $CO_2$ (with bound contaminants) but solid with respect to the cloth to be cleaned provides for a low demand from conventional resources. That is, the cleaning systems described herein eliminate the need for water to be used in a cleaning process for clothing. This provides benefits as compared to conventional systems which require water which is a scarce or non-existent resource in certain situations, such as during space travel and exploration. Since water is such a valuable resource, eliminating the need for water in cleaning and sanitation operations can provide immense benefits.

Although only a limited number of configurations have been shown and described, both closed-loop and open-loop, it will be appreciated that variations thereon are within the scope of the present disclosure. For example, various additional components or elements may be incorporated into the cleaning systems described herein. In one such example, additional deodorizers or the like may be employed because $CO_2$ may not sufficiently remove scents and odors and/or surfactants that may be introduced to remove stains or the like. Additionally, the cleaning systems described herein may be integrated into larger systems, or coupled thereto. For example, the condensers used to convert gaseous $CO_2$ to liquid $CO_2$ (e.g., downstream from the compressors) may be coupled to various other systems that operate to provide a material or fluid for heat pick up and cause the phase change of the $CO_2$.

Furthermore, although shown and described with specific valve configurations and operations, it will be appreciated that other valve configurations may be implemented in one or more of the above described embodiments, without departing from the scope of the present disclosure. For example, various embodiments may have fewer or greater valves than those shown, and the illustrated valve configurations are merely for explanatory and illustrative purposes. Additionally, although described as valves, these components may take the form of other structures, which are used to control fluid flow, as will be appreciated by those of skill in the art. Furthermore, in some embodiments, two or more of the illustrated and/or described valves may be combined into a single valve or valve assembly.

Additionally, it will be appreciated that sensors may be distributed throughout the various configurations and operably connected to a controller. The sensors may include temperature sensors, fluid sensors, flow sensors, pressure sensors, valve-state sensors, $CO_2$ liquid quality sensors (e.g., to detect debris/soil, etc.), and the like. Furthermore, various control elements may be employed, such as actuators, electronic controllers, motors, generators, electrical power supply, and the like may be provided from the station or craft on which the cleaning systems are employed.

Advantageously, embodiments of the present disclosure provide for improved cleaning systems for laundry and the like that may be used in microgravity environments. Benefits of the embodiments described herein include, for example and without limitation, elimination of the use of water for laundry and cleaning operations onboard space stations or space craft where water is a limited and valuable resource. Accordingly, water consumption for sanitation may be reduced by use of cleaning systems as described herein. Furthermore, advantageously, because of the manipulation of pressure to ensure the phase state of $CO_2$, the systems described herein may be wholly or primarily operated at room temperature, and no cooling is required to maintain the $CO_2$ in liquid state. In some configurations, additional heat may be input into the system to ensure boiling of liquid $CO_2$ to convert the liquid to a gas state for the purpose of cleaning and removing of soil and the like that is captured by the liquid $CO_2$.

Additionally, due to the $CO_2$ being removed from the clothing and evaporated, the clothes that are cleaned within the cleaning systems described herein may be dry when they are removed from the rotary cleaner. As such, no additional heating is required to perform a drying operation/function. Furthermore, the use of $CO_2$ may be gentler on clothing as compared to washing with water, and thus the useful life of the clothing may be extended beyond that possible with water-based cleaning solutions.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8% of a given value or other percentage change as will be appreciated by those of skill in the art for the particular measurement and/or dimensions referred to herein.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description but is only limited by the scope of the appended claims.

What is claimed is:

1. A carbon dioxide-based cleaning system for a low-gravity human occupancy environment, the carbon dioxide-based cleaning system comprising:
   a holding tank containing a supply of liquid carbon dioxide ($CO_2$);
   a rotary cleaner having an internal drum arranged therein and defining a cleaning cavity, the rotary cleaner fluidly coupled to the holding tank to receive liquid $CO_2$ therefrom, the rotary cleaner configured to output $CO_2$ with contaminants after a cleaning cycle;
   a compressor arranged to receive gaseous $CO_2$ and increase a pressure of the gaseous $CO_2$;
   a condenser arranged to receive the increased pressure gaseous $CO_2$ from the compressor and convert the gaseous $CO_2$ into liquid $CO_2$ and direct the liquid $CO_2$ into the holding tank, and
   a first valve configured to selectively fluidly couple the cleaning cavity of the rotary cleaner with the low-gravity human occupancy environment, wherein the low-gravity human occupancy environment is one of a spacecraft, a space station, or a station on a non-Earth celestial object, wherein the valve is configured to be opened to pressurize the cleaning cavity with air from the low-gravity human occupancy environment, and a second valve configured to selectively operate to cause evacuation of gas from the cleaning cavity of the rotary cleaner;
   wherein the rotary cleaner is configured as a rotating centrifuge or rotary phase separator configured to perform an operation for cleaning clothes in the absence of gravity, wherein the rotary cleaner is configured to separate liquids and gases within the rotary cleaner and wherein the internal drum and the rotary cleaner are configured to rotate in tandem resulting in liquid $CO_2$ being forced radially outward through the clothes, through holes of the internal drum, and collect on an internal surface of the rotary cleaner that is external to the internal drum.

2. The cleaning system of claim 1, wherein the output $CO_2$ with contaminants is directed from the rotary cleaner to the compressor after the cleaning cycle.

3. The cleaning system of claim 2, further comprising a distillation tank arranged between the rotary cleaner and the compressor, the distillation tank configured to receive at least one of gaseous and liquid $CO_2$ from the rotary cleaner and separate contaminants from the $CO_2$ and supply clean gaseous $CO_2$ to the compressor.

4. The cleaning system of claim 3, wherein the distillation tank is coaxially arranged within the rotary cleaner.

5. The cleaning system of claim 4, wherein the distillation tank comprises a third valve configured to selective fluidly couple a distillation cavity defined within the distillation tank with a cleaning cavity defined within the rotary cleaner and external to the distillation tank.

6. The cleaning system of claim 3, further comprising a heating element arranged to provide heat to the distillation tank.

7. The cleaning system of claim 3, further comprising a slug tank arranged to receive $CO_2$ and contaminants captured by the $CO_2$ from the distillation tank.

8. The cleaning system of claim 1, wherein the internal drum is porous to liquid $CO_2$ and contaminants carried by the liquid $CO_2$ but prevents clothing from passing out of the internal drum.

9. The cleaning system of claim 1, wherein the rotary cleaner comprises a cleaning cavity defined within the internal drum and an annular cavity is defined radially between an external surface of the internal drum and an internal surface of an outer housing of the rotary cleaner.

10. The cleaning system of claim 1, further comprising a pump associated with the second valve, the pump configured to provide a motive force to draw the gas from the cleaning cavity of the rotary cleaner.

11. The cleaning system of claim 1, further comprising a filter and pump connected to the rotary cleaner, wherein the pump is configured to pull liquid $CO_2$ from the rotary cleaner and pass it through the filter and then redirect the liquid $CO_2$ back into the rotary cleaner.

12. The cleaning system of claim 11, further comprising a dispenser arranged along a flow path through the pump and the filter, wherein the dispenser is configured to apply at least one of a deodorizer and a detergent to the liquid $CO_2$ prior to being redirected back into the rotary cleaner.

13. The cleaning system of claim 1, further comprising an auxiliary supply of $CO_2$ arranged upstream from the compressor, the auxiliary supply of $CO_2$ configured to provide additional $CO_2$ into the system to replenish losses from the holding tank.

14. The cleaning system of claim 1, further comprising a slug tank arranged to receive $CO_2$ and contaminants captured by the $CO_2$ from the rotary cleaner.

15. The cleaning system of claim 1, wherein the holding tank is a bellows tank arranged to maintain the liquid $CO_2$ under pressure and in a liquid state in the low-gravity human occupancy environment.

16. The cleaning system of claim 1, wherein the second valve is configured to selectively fluidly couple the cleaning cavity with the vacuum of space outside the low-gravity human occupancy environment.

17. The cleaning system of claim 1, wherein the condenser is configured as part of a coolant loop having a second working fluid, wherein the second working fluid is configured as a heat sink.

18. The cleaning system of claim 17, wherein the coolant loop is a dedicated coolant loop associated with the cleaning system.

19. The cleaning system of claim 17, wherein the coolant loop is configured as part of other systems of the spacecraft, the space station, or the station on the non-Earth celestial object.

\* \* \* \* \*